United States Patent [19]

Chadwick

[11] Patent Number: 4,636,910
[45] Date of Patent: Jan. 13, 1987

[54] VARISTOR OVERVOLTAGE PROTECTION SYSTEM WITH TEMPERATURE SYSTEMS

[75] Inventor: Philip Chadwick, Peterborough, Canada

[73] Assignee: Canadian General Electric Company Limited, Toronto, Canada

[21] Appl. No.: 729,065

[22] Filed: Apr. 30, 1985

[30] Foreign Application Priority Data

Apr. 11, 1985 [CA] Canada .................................... 478909

[51] Int. Cl.$^4$ ............................................. H02H 5/04
[52] U.S. Cl. ..................................... 361/103; 361/55
[58] Field of Search ................................ 361/103–106, 361/111, 118, 119, 15–17, 54–57; 323/210; 338/21

[56] References Cited

U.S. PATENT DOCUMENTS 4,174,529  11/1979  Hamman .............................. 361/16
4,432,029   2/1984  Lundquist ............................ 361/16

FOREIGN PATENT DOCUMENTS

1123895  5/1982  Canada .

Primary Examiner—A. D. Pellinen
Assistant Examiner—Jeffrey A. Gaffin
Attorney, Agent, or Firm—Raymond A. Eckersley

[57] ABSTRACT

A system having a bus protected against overvoltage by a plurality of series connected zinc oxide varistors in a column, uses temperature sensors to protect the varistors from damage. First temperature sensors detect that a safety tripping temperature has been reached and lower the bus voltage. Second temperature sensors detect a thermal runaway temperature has been reached and disconnect the bus. Normal operation is restored when the detected temperature falls below the safety tripping temperature. To protect against very rapidly increasing overvoltages, the current flow is monitored and when it exceeds a threshold a signal representing current is integrated. When the integrated value reaches a first preset level the voltage on the bus is reduced and when it reaches a second preset level the bus is disconnected to permit the varistors to cool.

11 Claims, 3 Drawing Figures

VARISTOR OVERVOLTAGE PROTECTION SYSTEM WITH TEMPERATURE SYSTEMS

BACKGROUND OF THE INVENTION

This invention relates to a protection system for non-linear varistors, and in particular it relates to a protection system for zinc oxide varistors used to prevent overvoltage on AC busses or lines.

Zinc oxide varistors are frequently used to prevent overvoltages on AC busses or on apparatus associated with such AC busses, such as for example with capacitors. Capacitors are often connected in an AC system to control phase or to provide voltage support, and the capacitors are vulnerable to overvoltages caused by faults. Such capacitors may be connected in banks comprising series and parallel connected capacitors to provide a desired total capacity and voltage requirement, and it will be understood that reference to a capacitor may include such an arrangement. Because capacitors and other equipment may be damaged by overvoltage, it is known to provide protection by connecting zinc oxide varistors across the capacitors or across other equipment to be protected. As an example of other equipment protected by varistors, reference is made to Canadian Patent No. 1,162,977—Chadwick, issued Feb. 28, 1984 to Canadian General Electric Company Limited which describes apparatus having thyristors protected by zinc oxide varistors.

When zinc oxide varistors are used to protect capacitors or other equipment having high voltages applied, the varistors may be arranged with a number in series, and may be surrounded by an insulator. This assembly can be referred to as a column. The number of varistors in series is selected to achieve a required design level of voltage, and there may be two or more columns in parallel.

A varistor is selected so that there is only a very small current flow at normal load, and as the voltage increases above normal there is an increased current flow which tends to limit the voltage. Columns of varistors function in the same manner as individual varistors and thus provide protection against overvoltages on busses to which capacitors or other devices are connected. However, the zinc oxide varistor has a limit to the energy it can handle before the varistor is damaged, and the limit is related to temperature and to incremental temperature. It is desirable to shut down the equipment by, for example, tripping a breaker, or alternatively to limit the varistor current in some manner before the varistor is damaged.

Canadian Patent No. 1,123,895—Hamann, issued May 18, 1982 to General Electric Company, describes a protection system for varistors where the current flowing through the varistors is monitored. A thermal analog circuit receives a signal representing the monitored current and determines if the monitored current represents an amount of energy being dissipated in the varistor which exceeds a predetermined value. If the calculated dissipation exceeds this predetermined value, the thermal analog circuit provides a trigger signal to an air gap device connected across the varistor causing the air gap to conduct. The thermal analog circuit may also determine when the monitored current represents a rate of rise of energy dissipation that is excessive, that is the determined rate of rise of current exceeds a predetermined level, and if so it provides a triggering signal to cause the air gap to conduct. When the air gap conducts, it rapidly lowers the voltage across the varistor and hence limits the rate of rise of the current.

While the system of Hamann provides protection, the protection is based only on current and the temperature must be determined from the current and from the changing ambient and operating conditions. In other words, the temperature is determined indirectly. More accurate protection is attainable by measuring actual temperature and by determining the total energy involved rather than rate of dissipation.

SUMMARY OF THE INVENTION

There are generally two situations which give rise to problems and damage of zinc oxide varistors. The first situation occurs when the rate of dissipation of energy becomes too high. This may result in the cracking of the disc of zinc oxide which is the main part of the varistor. It has been found, by way of example, that in some varistors a rise of 55° C. occuring in a predetermined interval, for example, 10 seconds (determined usually by test) or less, may result in cracking of the disc. The amount of energy required to produce this temperature rise in an unmounted disc is referred to as the full shot capability of the disc.

The second situation occurs when the zinc oxide disc reaches a temperature which could result in thermal runaway. If the temperature of a zinc oxide disc reaches a sufficiently high level, the current flow through the disc will increase although the operating voltage is maintained at the maximum continuous operating voltage (MCOV). This might, for example, be caused by a voltage surge. The resulting heat generated in the varistor may exceed the rate at which heat can be transferred outwardly from the varistor. To ensure that this situation does not arise, the initial temperature of the zinc oxide discs must be below a predetermined temperature so that if a full shot of energy is applied and is followed by continuous operation at the maximum continuous operating voltage or MCOV, the thermal runaway point is not reached.

The present invention provides for direct temperature measurement of at least one of the zinc oxide varistors in each column. In one form of the invention the temperature sensor or thermostat is set to detect a temperature that is one full shot of energy below the thermal runaway temperature, including a safety factor. For example, the thermal runaway temperature for a particular zinc oxide varistor may be between 160° and 170° C. The thermal runaway protective temperature might be selected as 150° C. to provide a factor of safety, and if one full shot of energy capability of the particular disc is eqivalent to 50° C., then a suitable safety tripping temperature would be 100° C. Therefore, in accordance with this form of the invention, each column of varistors would have a temperature sensor or thermostat set to detect a temperature of 100° C. (referred to as the safety tripping temperature), and when this temperature is reached breakers are tripped to remove the voltage from the busses to which the varistor column is connected. When the sensed temperature falls below the safety tripping temperature, the breakers can be reset and the busses connected to the system.

Another form of the invention uses two temperature sensors or thermostats per column. One is set to detect the safety tripping temperature as before, and the other is set to detect the thermal runaway protective temperature. This form of the invention is suitable for use in a system which has some manner of reducing the voltage on the busses, for example a system which incorporates capacitors connected to support voltage in the system. The tripping or removal of the capacitors will tend to reduce the voltage on the busses by a certain amount. Alternately, if the system includes a reactor which can be switched into the system, this will lower the voltage. According to this form of the invention, the first sensor detects when the temperature passes the safety tripping temperature and provides a signal which, for example, trips a capacitor bank and should result in a reduction in voltage on the busses. If there is a satisfactory reduction in voltage it will result in a decrease of varistor temperature below the safety tripping temperature, then normal operation may be restored. If the varistor temperature continues to rise and reaches the thermal runaway protective temperature, the second temperature sensor detects this and provides a signal which operates breakers to disconnect the busses and remove all the voltage therefrom. The normal operation can not be restored until the varistor temperature falls below the safety tripping temperature.

Temperature sensors will follow reasonable rates of change of energy dissipated, but they will not follow rapid changes such as might occur with a sudden surge lasting long enough to raise the internal temperature of the varistor discs by an undesirable amount before the temperature is detected by a temperature sensor at the surface of the disc. In instances like this it has been found that the rapid change in temperature of the zinc oxide discs is substantially directly proportional to the energy dissipated. As was previously mentioned, a full shot of energy in a predetermined interval, for example, a 10 second period, is all that a disc can withstand without cracking. The varistors can be protected against cracking of the discs in this manner by measuring the incremental energy dissipated in the varistor over an interval of time, for example one minute. It will be apparent that it is intended that the energy monitoring be used in conjunction with temperature monitoring which is responsive to at least the safety tripping temperature.

Because the voltage does not vary too widely, it may be assumed to be constant for the purpose of determining incremental energy. Thus, the energy is proportional to current. The incremental energy is determined by measuring the total current in the arrangement of parallel connected columns of varistors, using a gapped core current transformer. The output from the current transformer is filtered and rectified. The rectified output is used for at least two things. It is applied to a level detector or threshold detector which establishes a minimum current below which the circuitry does not operate, and the output is integrated. The output from the threshold detector is used for three things.
(1) The output is used to enable the integrator.
(2) The output is used to prime a timer.
(3) The output is applied to a resettable counter.

Each time the current falls below the threshold of the level detector or threshold detector, the timer begins to time out. If the current increases above the threshold before the time interval (of the the timer) elapses, the timer is reset and will not start to time out until the current again falls below the threshold level.

The output of the timer is used to reset the integrator that is connected to and is integrating the output from the rectifier. This is the integrator enabled by the threshold detector. Thus the incremental energy due to a particular energy creating event, is retained in the integrator circuit for the preset time interval following the last current pulse before the current dropped below the threshold level. This allows time for (a) equalization of the temperature within the zinc oxide discs, and (b) the temperature sensors to respond to the change in temperature.

The output of the integrator, which is substantially proportional to the incremental energy dissipated in the arrester due to an energy creating event, is compared to at least one and preferably two preset levels. Considering first the second preset level, this level is determined as the maximum expected energy that will have to be dissipated by the varistors. The actual energy capability of the varistor columns would normally be chosen to be greater than the maximum expected energy to provide a factor of safety. This factor of safety would, for example, provide time for the breakers to open after they were tripped when the second preset level was reached, i.e. the maximum expected energy level was reached.

The first preset level is below the second preset level. The first preset level is determined from the energy that could be involved if the breakers which were intended to trip to reduce voltage on the busses failed to trip. In other words, once this energy value is determined, it is used to calculate how much the first preset level is below the second preset level. The first and second preset levels may be determined from simulator studies.

In a system having some control of voltage, that is some way to reduce the voltage on the bus by a predetermined amount (such as tripping a capacitor bank), a control receives a signal when the first preset level is reached and it provides a signal to a breaker to cause the breaker to open and this should result in a reduction in voltage. This will normally permit the varistors to cool. The breaker will remain tripped for at least the time interval set by the timer, that is until the energy monitor is reset by the timer. If the first temperature sensor detects a temperature above the safety tripping temperature the breaker will remain open even though the timer has been reset. When the control receives a signal that the second preset level has been reached (presumably some unforeseen condition permitted excess energy to be dissipated even though action had been taken to attempt to reduce voltage on the busses), the control opens breakers to remove all operating voltage from the busses, permitting the varistors to cool. The breakers will not be reset until the first temperature sensor detects that the temperature has fallen below the safety tripping level. The protection provided by the second preset level of energy thus supplements the protection provided by the first. In a system which either has no way of providing a reduced voltage or which is not believed suitable for operating with two preset levels, then the control will provide a tripping signal to the breakers to remove all voltage from the busses when an energy level is determined to exceed a level corresponding to the first level.

It was previously mentioned that the output of the threshold detector was applied to a resettable counter. This counter provides a back-up. The counter provides protection against prolonged low overvoltage that might cause unnecessary stress on other equipment in the system. The counter counts the number of times the current in a column of varistors exceeds a threshold. As an example, a very approximate calculation can determine a number of pulses which could be used as a maximum limiting count. Assuming a current pulse having a rectangular shape and a 2 msec width, and assuming a peak current of A amperes per column, the energy E involved would be:

$$E = V \times N \times A \times 2 \times 10^{-3}$$

where
 V = voltage of the column
 N = number of columns

If the energy capability of an N column arrangement is C, and we use a safety factor S, preferably between about 80% and 90%, then the number of pulses P which would be accepable would be:

$$P = S \times (C/E)$$

The counter is set to a value of P. If the value for P was, for example, 90 then the count would be reached in 90/120=0.75 seconds for bidirectional pulses or 1.5 seconds for unidirectional current pulses over the threshold. This is, however, representative of a maximum count and a maximum time. It will be recalled that this counter is intended to protect other equipment from prolonged stress due to overvoltages not large enough to have the energy monitor trip the breakers. It is therefore not essential to the primary purpose of the invention which is to protect the varistors in the columns. It is useful as a secondary feature and has therefore been described. Because the counter is to protect other equipment connected to the bus from prolonged stress, the limiting count should be considerably less than that determined from the equation above. The count P should be high enough that pulses from a fault recovery do not cause tripping but low enough to limit the time during which stress from overvoltage lasts. A value for P of one third to one half that calculated has been found suitable. When the count is reached, the counter provides a tripping signal which trips the breakers and removes voltage from the busses or alternatively reduces voltage on the busses if this is suitable and available. The actual count is retained for the length of the time interval following the last pulse which exceeded the threshold level in the threshold detector, and then the counter is reset by the timer.

It is therefore an object of the invention to provide an improved protection system for varistors used to prevent overvoltages on AC busses.

It is also an object of the invention to provide improved apparatus for monitoring temperatures in columns of varistors used to prevent overvoltages on AC busses and reducing the voltage on the busses to prevent damaging the varistors.

It is a further object of the invention to provide an improved protection system for a plurality of varistors connected in series by monitoring the current and determining an integrated value of said current representing incremental energy and reducing the voltage across the plurality of varistors when the integrated value exceeds a predetermined level.

Therefore, in a simple form of the invention there is provided a protection system for a plurality of zinc oxide varistors which are connected between a bus and a source of reference potential to protect the bus from overvoltages, comprising at least a first temperature sensor mounted to one of said varistors, first circuit means connected to said first temperature sensor to provide a first signal when a predetermined safety tripping temperature is reached, a first relay connected to said circuit means and responsive to said first signal to operate a first circuit breaker connected to send bus to an open position to reduce the voltage on said bus.

DESCRIPTION OF THE PREFERRED EMBODIMENT

Figure 1:
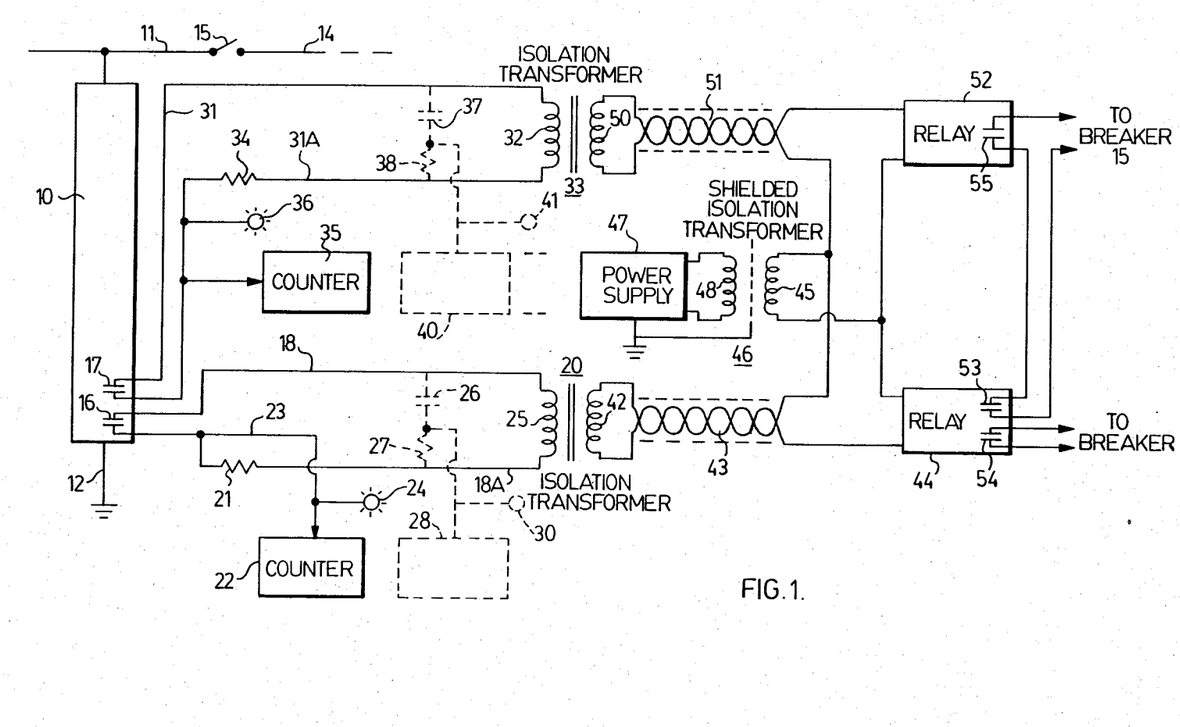
FIG. 1 is a block schematic diagram showing the temperature protection circuitry according to one form of the invention.

Referring to FIG. 1 there is shown a block schematic diagram of a form of protective apparatus utilizing two temperatures for the protection of a column or stack 10 of zinc oxide varistors. The column 10, shown schematically, is connected between a high voltage bus 11 and ground 12 to prevent overvoltages on bus 11. The bus 11 is connected to a line 14 of a power system by a breaker 15. A first and a second temperature sensor or thermostat 16 and 17, indicated schematically, are mounted to a varistor in column 10. They are preferably mounted to a lower varistor, i.e. adjacent ground, to minimize isolation problems. The first temperature sensor 16 is responsive to a safety tripping temperature to provide a signal on conductors 18, 18A which are connected to winding 25 of an isolation transformer 20. The first temperature sensor 16 may conveniently be a thermostat type, that is it presents a closed circuit condition when the safety tripping temperature is reached. This temperature may be of the order of 100° C., for example. The temperature sensor 16 is connected in series with a small resistor 21 across the conductors 18 and 18A. A counter 22 is connected by conductor 23 to the junction between temperature sensor 16 and resistor 21 to count the number of times the safety tripping temperature has been exceeded. An indicator light 24 indicates when the temperature is above the safety tripping temperature.

As was previously mentioned, there may be more than one column 10 connected between bus 11 and ground 12. Each of the other columns would also have a temperature sensor responsive to the safety tripping temperature and each would be connected in series with a respective isolating resistor across the winding 25 of isolation transformer 20. An additional temperature sensor arrangement for another column is indicated in FIG. 1 in broken lines, where 26 represents the temperature sensor or thermostat connected in series with a resistor 27 across winding 25. A counter 28 and an indicator 30 is also indicated in broken line. It will be apparent that any number of columns can be protected in this manner.

The second temperature sensor 17 is responsive to a protective thermal runaway temperature. The temperature sensor 17 may conveniently be a thermostat type as shown which closes at a preset temperature—in this case the protective thermal runaway temperature which for the purpose of this description includes a safety factor so that it is below the actual thermal runaway temperature. The protective thermal runaway temperature (which includes a safety factor as explained) may be of the order of 150° C. The temperature sensor 17 is connected in series with a resistor 34 to conductors 31 and 31A across winding 32, and a counter 35 and indicator lamp 36 are connected to the junction of sensor 17 and resistor 34. The counter 35 counts the number of times the protective thermal runaway temperature is exceeded, and lamp 36 indicates when the sensed temperature is above the protective thermal runaway temperature.

As before, each column will have a temperature sensor equivalent to sensor 17 responsive to thermal runaway temperature. One such additional sensor and related equipment is shown in broken line from where sensor 37 is in series with resistor 38 across winding 32 of transformer 33. From the junction of sensor 37 and resistor 38 is connected a counter 40 and an indicator lamp 41. It will be apparent that any number of columns of varistors can have protective thermal runaway temperature sensors and any one, by closing, will provide a low resistance across winding 32.

A winding 42 of isolation transformer 20 is connected by a shielded, twisted pair 43 to operate a relay 44. One conductor of twisted pair 43 is connected to relay 44 and the other conductor is connected to one side of winding 45 of shielded isolation transformer 46. The other side of winding 45 is connected to relay 44 to complete the circuit. A power source 47 is connected to winding 48 to provide power to the protective system.

Similarly winding 50 of isolation transformer 33 is connected by a shielded twisted pair 51 to operate relay 52. One conductor of twisted pair 51 is connected to relay 52 and the other conductor to one end of winding 45, and the other end of winding 45 is connected to relay 52 to complete the circuit.

The operation of FIG. 1 is straight forward. When sensors 16, 26, etc., are all open, that is the temperature for each column is below the safety tripping temperature, the isolation transformer 20 sees an open circuit and there is insufficient current flowing through relay 44 to operate the relay. The relay switches 53 and 54 are open. When one or more of sensors 16, 26, etc., close, then the current through winding 42 increases. Consequently the current through relay 44 increases and switches 53 and 54 are operated to their closed condition.

In the same manner, when sensors 17, 37, etc. are all open, that is the temperature is below the protective thermal runaway temperature, the isolation transformer 33 sees an open circuit and the current is not sufficient to operate relay 52. The relay switch 55 is open. When one or more of sensors 17, 27, etc., close then the current through winding 50 and relay 52 will increase and switch 55 will close.

As was previously discussed, if there is some means of partly reducing voltage on bus 11 such as a capacitor bank connected to bus 11, then switch contacts 54 are connected to circuitry to trip breakers and disconnect the capacitor bank to lower the voltage until the temperature drops below the safety tripping temperature. However if the temperature continues to rise, relay contacts 55 will close (contacts 53 are already closed) and this circuit is connected to trip breakers such as breaker 15 to disconnect bus 11 from the power source. On the other hand, if there is no means of partly reducing the voltage on bus 11, then sensors 17, 37 etc. and relay 52 with the associated circuitry are not required. Switch contacts 54 are then connected directly to trip breaker 15 and disconnect bus 11 from power line 14. In either case, normal operation may be restored when the temperature falls below the safety tripping temperature and sensors 16, 26, etc. open to cause relay switch contacts 54 to open.

It will, of course, be apparent that other types of temperature sensor means can be used as long as they can detect predetermined temperatures and be responsive to to predetermined temperatures to actuate breakers or other switches.

It is important that the temperature sensors 16, 17, 26, 37 etc., be arranged to indicate representative temperatures. It has been found that the temperature of the zinc oxide varistor in the middle of a column during operation is higher than the temperature of the end varistors. This is primarily because the end varistors are in contact with metal or other good heat conductor material which is exposed to the atmosphere. Thus, in normal conditions the end varistors run cooler. In one particular model test installation the end varistor was found to be some 12° C. cooler than the middle varistor. It is very desirable to monitor the temperature of the bottom varistor as it involves the lowest voltage. It would therefore be desirable to monitor the temperature of the bottom varistor and, in the above case, to add 12° C. to the monitored temperature. In other words, in any installation it is desirable to obtain a temperature profile, extending over at least the critical varistors, to determine the temperature difference between the hottest varistor and the varistor to be monitored, and to add this difference to the monitored temperature.

In the preceding description reference was made to capacitor banks and means for switching capacitance into and out of a system to support voltage. One apparatus for switching controlled amounts of capacitance into and out of a power system is a static VAR compensator, and many other types of apparatus are known. For example, the following patents describe various forms of such compensators: Canadian Patent No. 1,140,992—Gyugyi, issued Feb. 8, 1983; U.S. Pat. No. 3,992,661—Kelley, Jr., issued Nov. 16, 1976; and U.S. Pat. No. 4,394,614—Brennen et al, issued July 19, 1983.

Figure 2:
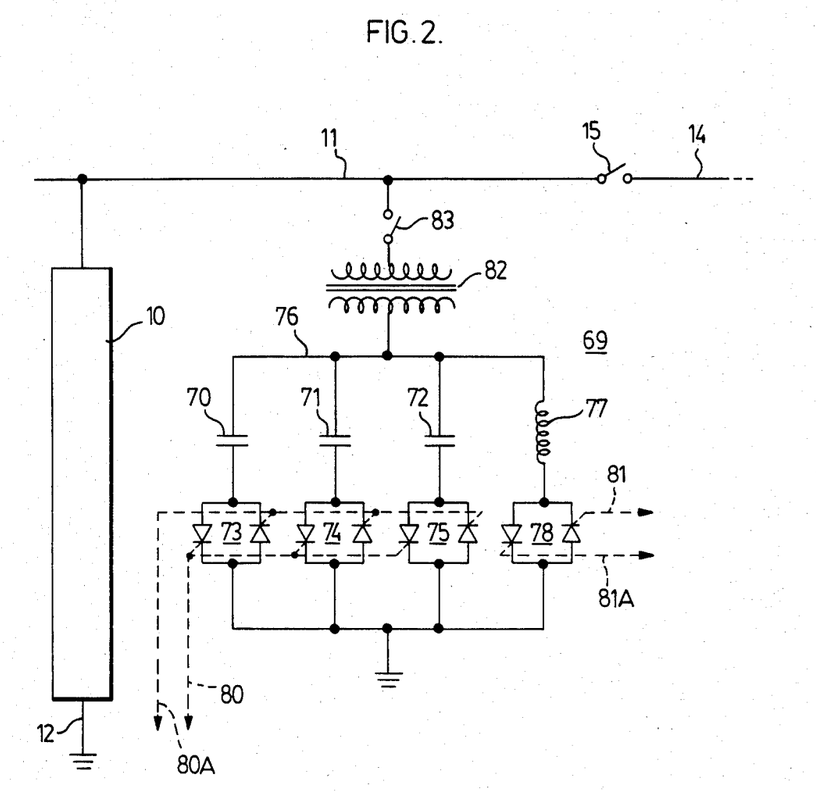
FIG. 2 is a schematic circuit drawing of a part of a power system showing a static VAR controller for controlling the power factor of the system.

Referring for the moment to FIG. 2, there is shown in schematic form an example of a static compensator or controller 69 which switches capacitance and inductance into a power system to control system voltage and/or power factor. Column 10 is shown connected between bus 11 and ground 12 as before. Three banks of capacitors, represented by 70, 71 and 72 are connected in series with respective thyristor switches 73, 74, 75 between a bus 76 and ground. An inductance 77 is connected in series with thyristors 78 between bus 76 and ground. The thyristor switches 73, 74 and 75 are individually controlled to conduct or not conduct by signals on cables 80 and 80A so that capacitor banks 70, 71 and 72 may individually be switched into or out of the circuit. The thyristor switches 78 are continuously controllable to switch controlled amounts of inductance into the circuit to provide control of the total capacitance to values between the capacitance provided by one bank of capacitors as is known, for example, from U.S. Pat. No. 4,104,576—Frank, issued Aug. 1, 1978 to ASEA AB. The thyristors 78 are controlled to conduct over a desired portion of a cycle by signals on conductors 81 and 81A.

The bus 11 is connected to a power system 14 through a breaker 15, and bus 76 is connected to bus 11 through a transformer 82 and breaker 83. When the controller 69 of FIG. 2 is in operation it draws a capacitive current to compensate or partly compensate for the inductive component of current that may be present in a power system. Thus, the operation of thyristor switches 73, 74, 75 from a closed condition to an open condition will remove capacitance and tend to reduce voltage on bus 11. Similarly, the operation of thyristor switch 78 from an open to a closed condition will switch reactor 77 into the circuit and add inductance which will tend to reduce voltage on bus 11. Opening of breaker 83 will disconnect the controller 69 which may or may not result in a tendency to drop voltage on bus 11 depending on the operating conditions. The opening of breaker 15 will, of course, reduce the voltage on bus 11 to zero.

It will be recalled that the temperature sensors 16, 17 (FIG. 1) may not provide an indication of temperature change rapidly enough to follow very abrupt increases in current through the zinc oxide varistors of column 10 (FIGS. 1 and 2). This problem is solved in the aforementioned Canadian Patent No. 1,123,895—Hamann by monitoring the current through each column of varistors and, when the rate of rise of energy dissipation (as determined from the monitored current) reaches a predetermined rate, then an air gap is triggered to cause current flow across the air gap which reduces voltage across the column. It will be apparent that a very large rate of rise lasting for only a short time could occur and this might be sufficient to trigger the air gap. However the large rate of rise might be immediately followed by a decrease in energy dissipation and there may not be enough energy involved to warrant any action. Air gaps are not satisfactory for use with the present system because once an air gap is triggered and current flows across it, the current cannot be controlled. It is not present practice to use shunt air gaps directly between a system bus and ground.

The present invention does not make use of a triggered air gap and it would not be desirable to open a breaker to either disconnect any parallel capacitance such as a capacitor bank or to disconnect the column from the system if the amount of energy is not sufficient to cause a critical temperature to be reached. Therefore the present invention monitors current to determine the energy which must be dissipated in the column and integrates the value determined for energy. When the integrated level reaches a predetermined value or level (and preferably two predetermined levels) which are preset as was previously described, then action is taken to reduce voltage.

Figure 3:
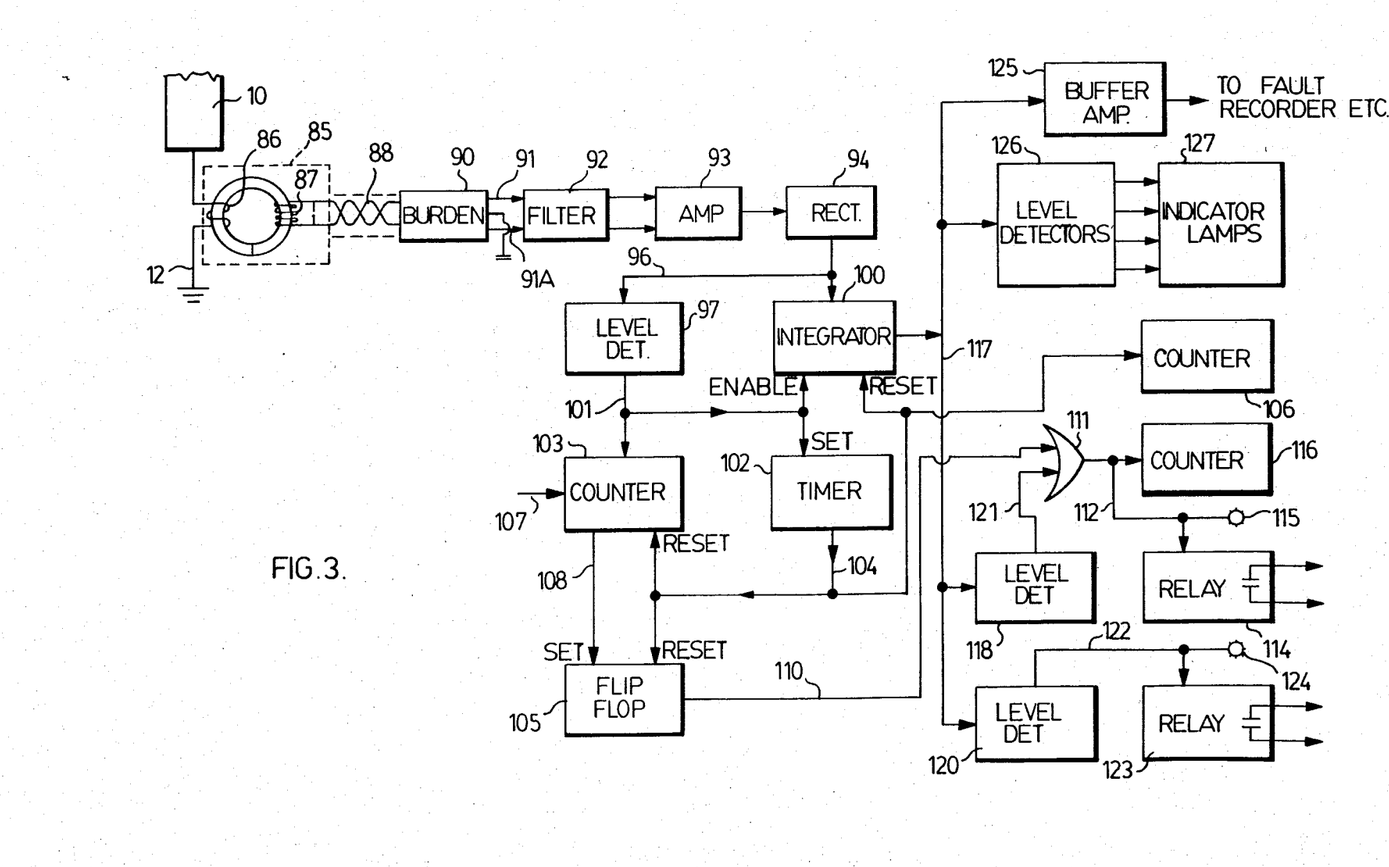
FIG. 3 is a block schematic diagram showing protection circuitry based on monitoring current flow through series connected varistors according to a form of the invention.

Referring now to FIG. 3, there is a gapped core current transformer 85 having a primary winding 86 connected between the base of column 10 and ground 12. The secondary winding 87 is connected by a twisted pair 88 to a burden 90 which loads the secondary. The burden 90 may, if desired, be located remotely, for example in a control room. Conductors 91 and 91A connect the burden 90 to a low pass filter 92. The filter 92 may, for example, have cut-off or corner frequency of the order of 10 kHz which is well above the frequency of rapidly changing varistor currents.

The output from filter 92 is connected to an amplifier 93 which, for example, may be a differential instrumentation amplifier having a high common mode rejection ratio of 60 dB at 10 kHz. The output of the amplifier 93 is connected to a full wave rectifier 94 which, in turn is connected to a conductor 96. Conductor 96 is connected to a threshold detector or level detector 97 and to an integrator 100. The level detector 97 establishes a minimum level below which there is no output. This threshold level preferably corresponds to the lowest level that can be reliably distinguished above the ambient electrical noise level of the system. When there is a signal above the threshold level, then level detector 97 provides a signal on conductor 101. Conductor 101 is connected to timer 102, counter 103 and integrator 100. The signal on conductor 101 primes or sets timer 102 and puts a count in counter 103. It also enables integrator 100. The timer 102 has a fixed time interval. This time interval is preferably determined from simulator studies and has been found to fall in the range of 10 seconds to 2 minutes with a preferred time interval being, for example, a one minute interval. As long as there is a signal on conductor 101 representing a current above the threshold as determined by level detector 97, the timer 102 will remain set or primed. As soon as the current falls below the minumum threshold, the timer 102 will start to time out, that is will start to time its time interval, for example one minute. If the current exceeds the threshold level, while the timer 102 is timing out there will be a signal level on conductor 101 and timer 102 will be set again. There is no output from timer 102 until it times out, that is until, for example, one minute has passed since there was a value above the threshold level as determined by level detector 97. When timer 102 times out it provides an output signal on conductor 104.

Conductor 104 is connected to a reset on counter 103, a reset on a flip-flop 105, a reset on integrator 100 and a counter 106. The counter 106 provides a count of the number of energy creating events.

Counter 103 counts the number of times the current exceeds the threshold level. It has set into it at set input 107 a predetermined count (i.e. the count P as previously discussed). The predetermined count may, for example, be of the order of 30. If this count is reached before the counter 103 is reset by a signal on conductor 104, it provides an output on conductor 108 which sets the flip-flop 105. When flip-flop 105 is in its set condition it provides an output on conductor 110 which is connected as one input to OR gate 111. The output of OR gate 111 is on conductor 112, and this conductor 112 is connected to a relay 114, an indicator light 115 and a counter 116. When there is an output from OR gate 111 on conductor 112 it causes relay 114 to trip and indicator lamp 115 to be illuminated. Relay 114 is connected to an apparatus which tends to reduce the voltage on the bus to reduce current through column 10; for example it may be connected to thyristor switches 73, 74, 75 (FIG. 2) to remove capacitance or to switch 79 to add inductance. The counter 116 keeps track of the number of times the relay 114 operates. The counter 103 is primarily to prevent prolonged stress from overvoltages to other equipment connected to bus 11 (FIG. 1), where the overvoltages may be of such a value that action by the energy monitor, as will be described, would take an unnecessarily long time.

The integrator 100 is enabled whenever the threshold is exceeded as was explained, and it integrates the signal on conductor 96 which represents current and hence is an indication of the energy that must be dissipated. A signal representing the integrated value (which represents incremental energy) is on conductor 117 which is connected to level detectors 118 and 120 which have respectively a first and a second preset levels. As was previously explained, the second preset level is the maximum expected level of energy that will have to be dissipated and this is less than the actual energy dissipation capability of the columns. The first preset energy level is below the second level by an amount of energy that is calculated to be involved if the breakers, which were to be tripped at the first preset level to reduce voltage, failed to trip. In other words, the first preset level is below the second preset level by an amount of energy that could be involved in the operating time of the breakers. If only one level is to be used because there is no means for reducing voltage or the system is not suitable for two levels, then a level should be selected approximately equivalent to the first level, that is, below the maximum expected level of energy that will have to be dissipated less a safety factor. If the level detector 118 detects a level exceeding the first preset level it provides a signal on conductor 121 as a second input to OR gate 111 thereby actuating relay 114, illuminating indicator lamp 115 and causing a count to be added to counter 116.

The level detector 120, when it detects a level on conductor 117 which exceeds its preset level, it provides a signal on conductor 122 which actuates relay 123 and illuminates indicator lamp 124. The relay 123 is connected to operate a breaker to remove all voltage from the bus to which column 10 is connected, for example, it opens breaker 15 (FIGS. 1 and 2).

It will be understood that the first and second preset levels set into level detectors 118 and 120 respectively, may be any two levels suitable for a system with a column 10 to be protected. It will also be understood that level detector 118 which actuates relay 114 may be used to open a breaker such as breaker 15 (FIGS. 1 and 2) in which case level detector 120 and relay 123 would not be required. This arrangement would be used if no means were available to lower the voltage somewhat on the bus 11 to which column 10 is connected.

The conductor 117 is also connected to a buffer amplifier 125 whose output may be connected to a fault recorder, for example. Conductor 117 is also shown as connected to level detectors 126 which, for example, may detect energy levels as a percent of the energy capability of the column of varistors (for example, energy levels of 25%, 50%, 75% and 100%) and actuate respective indicator lamps 127 to indicate the levels.

Thus, the present invention provides protection for the zinc oxide varistors in a column of varistors by directly sensing the temperature of at least one of the varistors, and reduces the voltage on the bus to which the column of varistors is connected when the temperature reaches a critical value. In addition the invention monitors current through the varistors in a column, and when the current exceeds a threshold, integrates the current and retains the integrated value for a predetermined time interval after the current drops below the threshold. A breaker is opened which tends to reduce the voltage on the bus to which the column is connected when the integrated value (representing incremental energy) exceeds a preset level. The present invention also provides a counter which counts the number of times the monitored current exceeds the threshold, retaining the count until the current remains below the threshold for a predetermined time interval, and if the count exceeds a predetermined count number it provides a signal to actuate a breaker to reduce voltage on the bus to which the column of variators is connected. The voltage may be reduced by some minor amount or may be reduced to zero.

What I claim as new and desire to secure by Letters Patent of the United States is:

1. A protection system for protecting zinc oxide varistors in combination with a system having a plurality of zinc oxide varistors connected between a bus and a source of reference potential to protect the bus from overvoltages, each said varistor having a safety tripping temperature and a higher thermal runaway temperature, said protection system comprising
    at least a first temperature sensor mounted to one of said varistors,
    first circuit means connected to said first temperature sensor and responsive to said safety tripping temperature being sensed to provide a first signal,
    a first circuit breaker connected to said bus having a closed position providing a predetermined voltage on said bus and an open position providing a reduced voltage on said bus,
    a first relay connected to said first circuit means and to said first circuit breaker and responsive to said first signal from said first circuit means to operate said first circuit breaker to said open position and reduce voltage on said bus,
    a second temperature sensor mounted to one of said varistors,
    second circuit means connected to said second temperature sensor and responsive to a protective thermal runaway temperature being sensed to provide a second signal, said protective thermal runaway temperature being less than said thermal runaway temperature,
    a second circuit breaker connected to said bus and having a closed position providing said predetermined voltage on said bus and an open position removing all voltage from said bus,
    a second relay connected to said circuit means and to said circuit and responsive to said second signal from said second circuit means to operate said second circuit breaker to said open position to remove all voltage from said bus.

2. A protection system as defined in claim 1 and further comprising
    at least one current sensor means electrically connected in series with said plurality of varistors for sensing current flow therethrough and for generating a fourth signal representing the current flow,
    integrator means connected to said at least one current sensor for receiving said fourth signal and providing a fifth signal representing the integrated value,
    a first level detector connected to said integrator means and responsive to said fifth signal reaching a first preset level for providing a sixth signal,
    a second level detector connected to said integrator means and having a second preset level greater than said first preset level and representing a maximum amount of energy that can be dissipated by said varistors less a safety factor, and responsive to said fifth signal reaching said second preset level providing a seventh signal,
    a third relay connected to said first level detector and responsive to said sixth signal to operate said first circuit breaker to said open position and reduce the voltage on said bus,
    a fourth relay connected to said second level detector and responsive to said seventh signal to operate said second circuit breaker to said open position and remove all voltage from said bus.

3. A protection system as defined in claim 1 in which said first circuit means provides a third signal when the temperature sensed by said first temperature sensor decreases below said safety tripping temperature, and said first and second relays being responsive to said third signal to operate said first and second circuit breakers to a closed position and restore normal operation.

4. A protection system as defined in claim 3 and further comprising
   at least one current sensor means electrically connected with said plurality of varistors for sensing current flow therethrough and for generating a fourth signal representing the current flow,
   integrator means connected to said at least one current sensor for receiving said fourth signal and providing a fifth signal representing the integrated value,
   a level detector connected to said integrator means and responsive to said fifth signal reaching a preset level for providing a sixth signal, a third relay connected to said level detector and responsive to said sixth signal to operate said first circuit breaker to an open position to reduce voltage on said bus.

5. A protection system for protecting zinc oxide varistors against overtemperature due to excessive current in a system having a plurality of zinc oxide varistors which are connected in series within an insulative casing to form a column, said column being connected between a bus adapted to carry a high voltage and ground for protection of the bus against overvoltages, said bus being connected to a power system by a first circuit breaker, and a second said circuitbreaker said bus having connected thereto through a first switching means having an open and a closed condition, an arrangement of a plurality of capacitors for controlling power factor in said power system, said protection system for protecting zinc oxide varistors comprising
   a first and a second temperature sensor mounted on one of said varistors,
   first circuit means connected to said first and second temperature sensors and responsive to said first temperature sensor reaching a predetermined safety tripping temperature providing a first signal and responsive to said temperature sensor reaching a predetermined protective thermal runaway temperature providing a second signal, said protective thermal runaway temperature being less than the thermal runaway temperature of said varistors by a safety factor and said safety tripping temperature being less than said protective thermal runaway temperature,
   a first relay means connected to said first circuit means and to said first switching means and responsive to said first signal to operate said first switching means to its open condition for disconnecting said arrangement of capacitors and reducing the voltage on said bus,
   a second relay means connected to said first circuit means and to said first circuit breaker and responsive to said second signal to operate said first circuit breaker to its open condition for disconnecting said bus from said power system to permit said varistors to cool,
   a current sensor means for sensing the current through said varistors of said column, said current sensor means generating a third signal proportional to the current through said varistors,
   rectifier means connected to said current sensor means for receiving said third signal and providing a fourth signal which is representative of a rectified third signal,
   a threshold detector connected to said rectifier means for receiving said fourth signal and providing a fifth signal when said fourth signal exceeds a minimum threshold,
   integrator means connected to said rectifier means for receiving said fourth signal and responsive to said fifth signal to provide a sixth signal representing the integrated value of said fourth signal,
   a first level detector connected to said integrator means for receiving said sixth signal and responsive to said sixth signal reaching a first predetermined preset level for providing a seventh signal,
   first connection means connecting said first level detector to said first relay means for applying thereto said seventh signal, said first relay means being responsive to said seventh signal to operate said first switching means to its open condition,
   a second level detector connected to said integrator means for receiving said sixth signal, and resonsive to said sixth signal reaching a second predetermined preset level greater than said first preset level for providing an eighth signal, said second preset level representing a maximum expected amount of energy that might have to be dissipated by said columns and being less than the energy dissipation capability of said columns, and said first preset level being below said second level by an amount of energy involved by failure of said second breaker to operate, and
   second connection means connecting said second level detector to said second relay means for applying thereto said eighth signal, said second relay means being responsive to said eighth signal to operate said first circuit breaker to its open condition to permit said varistors to cool.

6. A protection system as defined in claim 9 and further comprising a reactor and second switching means connecting said reactor between said bus and ground, said second switching means being connected to said first relay means and being responsive to said seventh signal to operate said second switching means to a closed condition, reducing the voltage on said bus.

7. A protection system as defined in claim 5 and further comprising
   timer means having a set terminal, an output terminal and a preselected time interval, said set terminal being connected to said threshold detector for receiving said fifth signal therefrom and being responsive to each pulse in said fifth signal to initiate the timing of said time interval, said time interval expiring when no pulses are received during the said time interval, said timer providing at its output a ninth signal when said time interval expires, and
   second circuit means connecting the output of said timer means to said integrator means to reset said integrator means to a reference value for commencing another integration.

8. A protection system as defined in claim 7 in which said preselected time interval is in the range of 10 seconds to two minutes.

9. A protection system as defined in claim 7 and further comprising
   a counter having an input, an output, a reset terminal and a preselected count, said input being connected to said threshold detector for receiving said fifth signal therefrom and responsive to said fifth signal to count the pulses received in said fifth signal since the timer received a reset signal at said reset terminal for providing at said output a tenth signal when said count is reached, said reset terminal being connected to said output of said timer for receiving said ninth signal for resetting said counter, third circuit means connecting the output of said counter to said first relay means for applying thereto said tenth signal, said first relay means being responsive to said tenth signal to operate said second circuit breaker to its open condition and reduce the voltage on said bus.

10. A protection system as defined in claim 7 in which said first and second relay means are responsive to said first signal from said first circuit means indicating the temperature has decreased below said safety tripping temperature to operate any of said first and second circuit breakers in their open position to their closed position to restore normal operation.

11. A protection system for protecting zinc oxide varistors against overvoltages in combination with a system having a plurality of zinc oxide varistors connected in series to form a column, said column being connected between a bus adapted to carry a high voltage and ground, said bus being connected to a power system by a circuit breaker, each said varistor having a safety tripping temperature and a higher thermal runaway temperature, said protection system comprising, a temperature sensor mounted to one of said varistors, first circuit means connected to said temperature sensor and responsive to said temperature sensor sensing a temperature exceeding said safety tripping temperature to provide a first signal, a first relay means connected to said first circuit means and to said circuit breaker and responsive to said first signal to operate said circuit breaker to its open position and disconnected said bus from said power system, a current sensor means for sensing current through said varistors in said column and generating a second signal representing the sensed current, integrator means connected to said current sensor means for receiving said second signal and providing a third signal representing the integrated value of said second signal, a level detector connected to said integrator means and responsive to said third signal reaching a preset level to provide a fourth signal, said preset level representing a maximum expected amount of energy that would have to be dissipated in the column less a safety factor, a second relay means connected to said level detector and to said circuit breaker and responsive to said fourth signal to operate said circuit breaker to its open position and disconnect said bus from said power system, said first circuit means being responsive to said temperature sensor sensing a temperature decreasing below said safety tripping temperature to provide a fifth signal, said first relay means being responsive to said fifth signal, in the absence of a fourth signal at said second relay means, to operate said circuit breaker to its closed position, a counter having an input connected to said current sensor means for counting pulses of said second signal representing pulses of current exceeding a threshold, said counter having a reset terminal and an output, said counter having a preselected count set therein and providing at said output a sixth signal when said preselected count is reached, said preselected count representing a number of pulses corresponding to an energy level which is one third to one half the energy handling capability of said columns, a timer having a set terminal and an output, said set terminal being connected to said current sensor means for receiving pulses of said second signal and being placed in a set condition by each pulse received, said timer having a preselected time interval, said time interval being initiated each time a pulse of said second signal placed it in a set condition and expiring when no pulses are received during said time interval, said timer providing at said timer output a seventh signal when said time interval expires, said timer output being connected to said integrator means providing thereto said seventh signal to restart the said integrator means, and said timer output being connected to said reset terminal of said counter providing thereto said seventh signal to reset said counter to start the count again, and second circuit means connecting the output of said counter and said first relay means to provide said sixth signal to said first relay means, said first relay means being responsive to said sixth signal to operate said circuit breaker to its open position and disconnect said bus from said power source.

* * * * *